(12) United States Patent
Short et al.

(10) Patent No.: US 9,669,471 B2
(45) Date of Patent: Jun. 6, 2017

(54) DEVICES FOR ISOLATING ACOUSTIC VIBRATIONS IN METALWORKING SYSTEMS

(71) Applicants: Matthew A. Short, Wilmington, OH (US); Karl F. Graff, Hillard, OH (US)

(72) Inventors: Matthew A. Short, Wilmington, OH (US); Karl F. Graff, Hillard, OH (US)

(73) Assignee: CUMBERLAND & WESTERN RESOURCES, LLC, Bowling Green, KY (US)

( * ) Notice: Subject to any disclaimer, the term of this patent is extended or adjusted under 35 U.S.C. 154(b) by 0 days.

(21) Appl. No.: 14/844,867

(22) Filed: Sep. 3, 2015

(65) Prior Publication Data

US 2016/0067789 A1    Mar. 10, 2016

Related U.S. Application Data

(63) Continuation-in-part of application No. 14/998,004, filed on Sep. 5, 2014, now abandoned, which is a
(Continued)

(51) Int. Cl.
*B23B 37/00* (2006.01)
*B23B 31/02* (2006.01)
(Continued)

(52) U.S. Cl.
CPC .............. *B23B 37/00* (2013.01); *B23B 31/02* (2013.01); *B23B 31/083* (2013.01);
(Continued)

(58) Field of Classification Search
CPC ... B23B 37/00; B23B 2240/28; B23B 29/125; B23B 2250/16; B23B 2270/10;
(Continued)

(56) References Cited

U.S. PATENT DOCUMENTS 3,930,173 A    12/1975  Banko
6,924,585 B2 *  8/2005  Goodson ............... B06B 1/0618
                                                    310/325
(Continued)

FOREIGN PATENT DOCUMENTS

CN    202418386 U    9/2012
DE    WO 0121350 A1 *  3/2001  ....... B23B 29/03446
(Continued)

OTHER PUBLICATIONS

Machine translations, Japan patent document, JP 2002-219606A, "Ultrasonic Milling Device", Murakawa, M., et al., Aug. 2002.*
(Continued)

*Primary Examiner* — Daniel Howell
*Assistant Examiner* — Chwen-Wei Su
(74) *Attorney, Agent, or Firm* — Frost Brown Todd LLC

(57) ABSTRACT

An ultrasonic machining module that includes an ultrasonic transducer, wherein the ultrasonic transducer is adapted to receive a machining tool and a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the machining tool, thereby preventing unwanted vibrations from traveling backward or upward into the machining system.

5 Claims, 10 Drawing Sheets

Related U.S. Application Data continuation-in-part of application No. 13/046,099, filed on Mar. 11, 2011, now Pat. No. 8,870,500.

(60) Provisional application No. 61/312,738, filed on Mar. 11, 2010.

(51) Int. Cl.
*B23B 31/08* (2006.01)
*B23B 31/117* (2006.01)

(52) U.S. Cl.
CPC ....... *B23B 31/1179* (2013.01); *B23B 2231/24* (2013.01); *B23B 2240/28* (2013.01); *B23B 2250/16* (2013.01); *B23B 2260/108* (2013.01); *B23B 2260/126* (2013.01); *B23B 2270/10* (2013.01); *Y10S 408/70* (2013.01); *Y10T 408/23* (2015.01)

(58) Field of Classification Search
CPC .......... B23B 2270/56; B23B 2260/108; B23Q 1/0009; Y10S 408/70; Y10T 408/23; Y10T 409/309408; Y10T 409/30952; B06B 1/00; B06B 1/02; A61B 17/320068; H02N 2/103; H01L 41/09
USPC ........................ 310/323.18, 346, 323.12, 328
See application file for complete search history.

(56) References Cited

U.S. PATENT DOCUMENTS

| | | | | |
|---|---|---|---|---|
| 8,334,635 B2 * | 12/2012 | Voegele | ........... | A61B 17/32006 310/323.12 |
| 2006/0229132 A1 * | 10/2006 | Sander | ................... | B23B 37/00 464/51 |
| 2009/0066192 A1 | 3/2009 | Taki et al. | | |
| 2011/0170964 A1 * | 7/2011 | Rabat | ................... | B23B 29/125 408/17 |
| 2011/0222975 A1 | 9/2011 | Short | | |
| 2011/0268516 A1 * | 11/2011 | Short | ................... | B23B 29/125 408/17 |
| 2012/0107062 A1 * | 5/2012 | Moraru | ................. | B23B 29/125 408/17 |
| 2013/0014592 A1 | 1/2013 | Mueller et al. | | |

FOREIGN PATENT DOCUMENTS

| | | | | | |
|---|---|---|---|---|---|
| EP | 1439320 A1 | | 7/2004 | | |
| JP | 05208349 A | * | 8/1993 | | |
| JP | 2002219606 A | * | 8/2002 | | |
| JP | WO 2009101987 A1 | * | 8/2009 | ......... | B23B 31/1179 |

OTHER PUBLICATIONS

Machine translations, Japan patent document, JP05208349A, "Spindle unit", Tanimoto et al, Aug. 1993.*

International Search Report and Written Opinion of the International Searching Authority received in PCT/US2015/48379, mailed May 2, 2016.

* cited by examiner

DEVICES FOR ISOLATING ACOUSTIC VIBRATIONS IN METALWORKING SYSTEMS

CROSS-REFERENCE TO RELATED APPLICATIONS

This patent application is a continuation-in-part of U.S. patent application Ser. No. 14/998,004 filed on Sep. 5, 2014 and entitled "Devices for Isolating Acoustic Vibrations in Metalworking Systems", which was originally filed as U.S. Patent Application 62/046,248 and subsequently converted to U.S. patent application Ser. No. 14/998,004. U.S. patent application Ser. No. 14/998,004 is a continuation-in-part of U.S. patent application Ser. No. 13/046,099 filed on Mar. 11, 2011 and entitled "Ultrasonic Machining Module", now U.S. Pat. No. 8,870,500, which claimed the benefit of U.S. Patent Application Ser. No. 61/312,738 filed on Mar. 11, 2010 and entitled "Accessory Module for Applying Ultrasonic Energy to Machining Tools". The disclosures of all of these previously filed applications are incorporated by reference herein in their entirety and made part of the present patent application for all purposes.

BACKGROUND OF THE INVENTION

The described invention relates generally to systems for machining metals and other materials and more specifically to a system for machining metals and other materials into which an ultrasonic machining module has been incorporated, wherein the ultrasonic machining module is compatible with a variety of existing machining systems, devices, and processes due to its vibration-isolating characteristics.

Machining, which is a collective term for drilling, milling, reaming, tapping, and turning, is an enabling technology that impacts virtually all aspects of manufacturing in the United States and elsewhere in the world. In a specific example, a milling machine is a machining tool used to machine solid materials. Milling machines are typically classified as either horizontal or vertical, which refers to the orientation of the main spindle. Both types range in size from small, bench-mounted devices to much larger machines suitable for industrial purposes. Unlike a drill press, which holds the workpiece stationary as the drill moves axially to penetrate the material, milling machines move the workpiece axially and radially against the rotating milling cutter, which cuts on its sides as well as its tip. Milling machines are used to perform a vast number of operations, from simple tasks (e.g., slot and keyway cutting, planing, drilling) to complex tasks (e.g., contouring, diesinking).

Cutting and drilling tools and accessories used with machining systems (including milling machines) are often referred to in the aggregate as "tooling". Milling machines often use CAT or HSK tooling. CAT tooling, sometimes called V-Flange tooling, is the oldest and probably most common type used in the United States. CAT tooling was invented by Caterpillar Inc. of Peoria, Ill., to standardize the tooling used on Caterpillar machinery. HSK tooling, sometimes called "hollow shank tooling", is much more common in Europe where it was invented than it is in the United States. The holding mechanism for HSK tooling is placed within the hollow body of the tool and, as spindle speed increases, it expands, gripping the tool more tightly with increasing spindle speed.

Improving the machinability of certain materials is of significant interest to manufacturers of military equipment and certain commercial hardware, as well as to the builders of machine tools. More specifically, very advanced materials such as armor plates and composites are notoriously difficult to machine with standard systems and methods. High-speed systems and ultra-hard tool bits are used for such material, but provide only a marginal increase in tool life and productivity. Significant improvements in the machinability of materials have been achieved by implementing advanced technologies such as laser, waterjet, and EDM cutting. However, these processes are high in capital cost, limited in application, and differ too much to be used in standard machine shops. Also, the application of these processes is limited to certain types of cuts in the materials on which they are typically used.

Ultrasonic-assisted machining was developed in the United States in the 1950's and was used for machining materials that were considered to be difficult to machine at the time. The more modern process of ultrasonic machining (UM) involves the application of high power ultrasonic vibrations to "traditional" machining processes (e.g., drilling, turning, milling) for improving overall performance in terms of faster drilling, effective drilling of hard materials, increased tool life, and increased accuracy. This is typically accomplished by using drill bits manufactured from high speed steel (HSS), carbide, cobalt, polycrystalline diamond composite, or other suitable materials affixed to a collet (e.g., shrink fit, compression, hydraulic, or mechanical) that is affixed to an ultrasonic (US) transmission line. In this context, UM is not the existing ultrasonic-based slurry drilling process (i.e., impact machining) used for cutting extremely hard materials such as glass, ceramics, quartz. Rather, this type of UM concerns methods for applying high power ultrasonics to drills, mills, reamers, taps, turning tools, and other tools that are used with modern machining systems.

Although the use of ultrasonics with modern machining systems provides significant and numerous benefits, there are certain technical challenges involved, not the least of which is the incorporation of ultrasonic energy into machining systems that were not originally designed to accommodate this type of energy output. Thus, there is an ongoing need for an ultrasonic machining module that is compatible with and that may be incorporated into existing machining systems without damaging or negatively impacting the performance of such systems.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a first device for use in a machining system is provided. This device, which is referred to herein as an ultrasonic machining module, includes an ultrasonic transducer having a known nodal position, wherein the ultrasonic transducer is adapted to receive a tool bit; and a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the tool bit, thereby preventing unwanted vibration from traveling backward or upward into the machining system.

In accordance with another aspect of the present invention, a second device for use in a machining system is provided. This device, which is referred to herein as an ultrasonic machining module, includes an ultrasonic transducer having a known nodal position, wherein the ultrasonic transducer is adapted to receive a tool bit; and a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the tool bit, thereby preventing unwanted vibration from traveling backward or upward into the machining system; and a tool holder, wherein the tool holder and the top portion of the housing are mechanically coupled to one another.

In yet another aspect of this invention, a third device for use in a machining system is provided. This device, which is referred to herein as an ultrasonic machining module, includes an ultrasonic transducer having a known nodal position, wherein the ultrasonic transducer is adapted to receive a tool bit; and a vibration-isolating housing adapted to be both compatible with a machining system and to receive the ultrasonic transducer therein, wherein the housing further includes at least one modification for isolating all vibrations generated by the ultrasonic transducer when the device is in operation except axial vibrations transmitted to the tool bit, thereby preventing unwanted vibration from traveling backward or upward into the machining system; a tool holder, wherein the tool holder and the top portion of the housing are mechanically coupled to one another; and an internal sealing system. The internal sealing system includes: a conical alignment boss formed in the transducer at the nodal point thereof; a conical flange formed in the housing, wherein the conical flange is stretched within its elastic limits over the conical alignment boss thereby sealing the housing against a horizontal base formed on the transducer; and a groove formed in the horizontal base on the transducer for receiving an O-ring, wherein the O-ring provides additional sealing properties to the device.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Although the following detailed description contains many specifics for purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
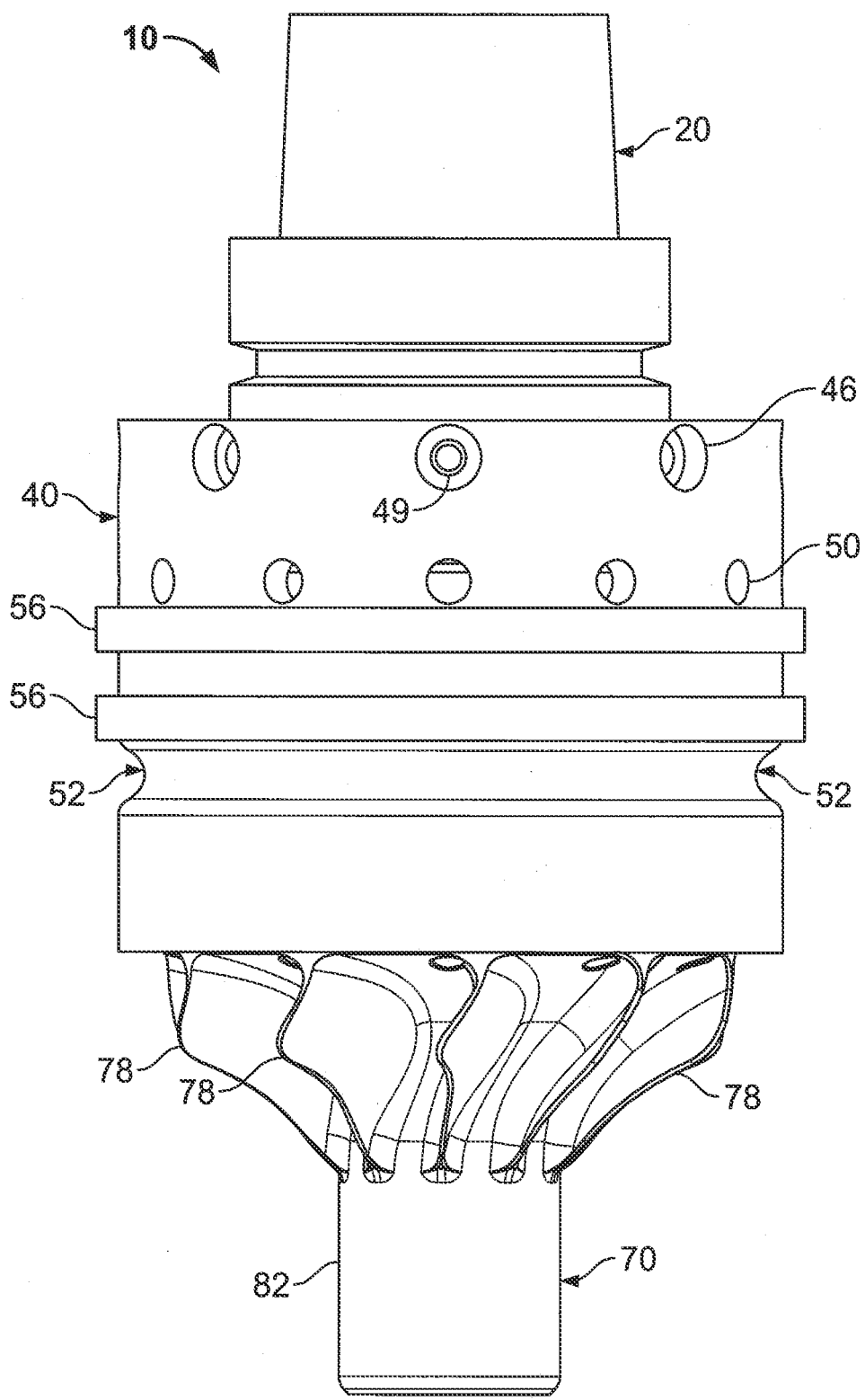
FIG. 1 is a side view of an ultrasonic machining module in accordance with an exemplary embodiment of the present invention.
Figure 2:
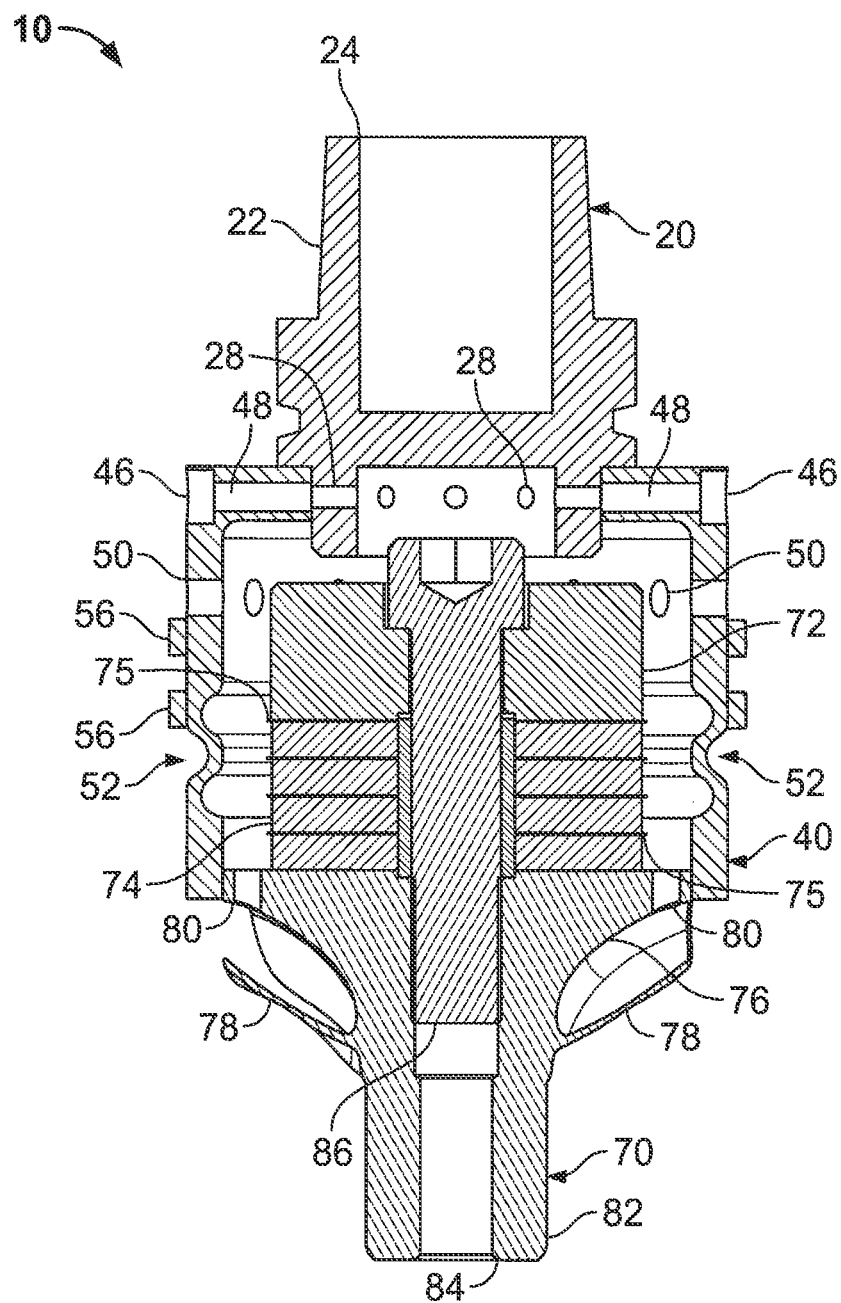
FIG. 2 is a cross-sectional view of the ultrasonic machining module of FIG. 1.

The present invention provides various ultrasonic machining modules that have been adapted for incorporation into existing commercially available machining systems that were not originally designed to accommodate such ultrasonic modules. With reference to FIGS. 1-2, a first exemplary embodiment of the present invention provides an ultrasonic machining module for use in a machining system, wherein the ultrasonic machining module includes: (a) an ultrasonic transducer, wherein the ultrasonic transducer is adapted to receive a tool bit, and wherein the ultrasonic transducer further comprises: (i) a front mass; (ii) a back mass; (iii) a plurality of piezoelectric ceramics positioned between the front mass and back mass; (iv) at least one electrical connector; and (v) a bolt passing through the front mass, back mass, and ceramics, wherein the bolt is operative to apply compressive force to the ceramics; and (b) a vibration-isolating housing adapted to be both compatible with a machining system and to receive the ultrasonic transducer therein. The housing further includes a spring-like feature formed radially therein above the front mass, wherein the spring-like feature further includes a curved and thinned section of the housing, and wherein the curved and thinned section of the housing is operative to permit flexion in the housing for isolating all vibrations generated by the ultrasonic transducer when the device is in operation except axial vibrations transmitted to the tool bit, thereby preventing unwanted vibrations from traveling backward or upward into the machining system and potentially causing damage to the system or other problems. This particular embodiment is disclosed in U.S. patent application Ser. No. 13/046,099 (now U.S. Pat. No. 8,870,500), which is expressly incorporated by reference herein in its entirety, for all purposes.

With reference to FIGS. 1-2, an exemplary embodiment of ultrasonic machining module 10 includes three basic components: tool holder 20, housing 40, and ultrasonic transducer assembly 70. Tool holder 20 includes upper portion 22, which further includes primary bore 24 formed therein for attaching machining module 10 to the main spindle (e.g., CAT 40, 60 or HSK) of a machining system (not shown). Lower portion 26 of tool holder 20 includes a plurality of secondary bores 28 that cooperate with similar structures in housing 40 to mechanically couple tool holder 20 to housing 40 using connectors 49 (i.e., centering bolts). In some embodiments of the present invention, tool holder 20 is shrink-fit to housing 20 in addition to or instead of being bolted thereto.

Housing 40 includes a rigid cylindrical body 42 that further includes a centrally located aperture 44 that is adapted to receive tool holder 20, and a bottom opening 54, into which ultrasonic transducer assembly 70 is inserted. Circumferential electrical contacts 56 (i.e., slip rings) are positioned on the exterior of housing 40. As will be appreciated by the skilled artisan, the use of other types of electrical contacts is possible with this invention. For example, a single contact 56 may be utilized or the contacts may extend through the spindle of the machining system, while still providing or maintaining the flow of cooling air through the spindle. The top or upper portion of housing 40 includes a plurality of apertures 46 that connect to a plurality of bores 48 that correspond to the placement of bores 28 in tool holder 20 when machining module 10 is assembled. A series of connectors 49 are inserted into bores 48 and 28 for the purpose of bolting tool holder 20 to housing 40. A plurality of air outlets 50 is formed in housing 20. As described in greater detail below, air outlets 50 cooperate with specific structures on ultrasonic transducer assembly 70 to cool machining module 10 when in use, thereby reducing or eliminating the need for any separate or external system or apparatus for cooling piezoelectric ceramics 74.

Housing 40 also includes circumferential region 52, which acts as a vibration isolating spring, and as such is characterized as a "spring-like structure". In the exemplary embodiment, region 52 includes a contoured and thinned section of the material from which housing 40 is manufactured. When machining module 10 is in use, region 52 permits a degree of flexion in housing 40, thereby absorbing and/or isolating acoustic energy generated by ultrasonic transducer assembly 70 and preventing unwanted vibration from traveling backward or upward into the spindle or other mechanical components of the machining system. Axial vibration generated by ultrasonic transducer assembly 70 is not diminished by region 52; therefore, torque is still delivered to the tool bit or other item that is attached to front mass 76 and that is being used to machine a workpiece. Within the context of this invention, the term "tool bit" should be understood to mean drill bit or any other item that is attached to front mass 76. Essentially, region 52 is operative to absorb and/or isolate most or all vibrational modes except the axial vibrations directed toward the workpiece.

Ultrasonic transducer assembly 70 includes back mass 72, front mass 76, and a plurality of piezoelectric ceramics 74 positioned between these two structures. A plurality of electrodes 75 are sandwiched between piezoelectric ceramics 74, and bolt 86 passes through back mass 72, ceramics 74, electrodes 75 and a portion of front mass 76. When tightened, bolt 86 is operative to apply compressive force to piezoelectric ceramics 74. Although not shown in the Figures, a series of electrical lead wires are typically attached to at least one of the electrodes 75. These wires exit the interior of housing 40 either through housing 40 or though tool holder 20 where they then connect to circumferential electrical contacts 56. Brush contacts or other types of electrical contacts may be used to provide electricity to machining module 10. Transducer assembly 70 typically operates at power levels ranging from 1 kW-5 kW and amplitudes ranging from 25 μm to 150 μm.

In the exemplary embodiment of ultrasonic machining module 10 shown in FIGS. 1-2, ultrasonic transducer assembly 70 further includes a plurality of cooling members, fins or vanes 78 that are located circumferentially around front mass 76 just beneath a plurality of air inlets 80 that are also formed in front mass 76. When ultrasonic machining module 10 rotates, vanes 78, which simulate a compressor wheel, are operative to draw air upward and through air inlets 80. Air then flows through the interior of housing 40 across ceramics 74 for cooling purposes, and exits housing 40 though air outlets 50. As shown in the Figures, the front or bottom area of front mass 76 includes a tapered collet 82 that further includes bore 84, which is adapted to receive a drill bit, milling tool, or other item. As will be appreciated by the skilled artisan, a drill bit or other item (not shown) may be attached to collet 82 using the process known as shrink-fitting. By heating the mass around bore 84 uniformly, it is possible to significantly expand the diameter of the bore. The shaft of a drill bit or other item is then inserted into the expanded bore. Upon cooling, the mass around the bore shrinks back to its original diameter and frictional forces create a highly effective joint. In an exemplary embodiment, the bottom edge of housing 40 is attached to the top portion of front mass 76 using a shrink-fit process for facilitating removal of case 40 for repairing ultrasonic machining module 10. As will be appreciated by the skilled artisan, other means of attaching tooling items to front mass 76 and/or attaching housing 40 to transducer assembly 70 are possible and are compatible with the present invention.

Some or all of the metal components of ultrasonic machining module 10 are typically manufactured from A2 tool steel. Alternately, D2, SS, 4140, and/or 350-M tool steel may be used. Regardless of the material used, front mass 76 and back mass 72 may both be manufactured from the same material as a means for reducing amplitude. In general terms, mixing of the mass of these components adjusts amplitude. In the exemplary embodiment shown in FIGS. 1-2, total module length is about 7.5 inches (19.1 cm). However, the present invention is scalable and miniaturized variants of ultrasonic machining module 10 are compatible with medical and surgical systems and devices, among other applications.

With reference to FIGS. 3-8, this invention provides additional structures (beyond circular geometric reliefs formed in the housing wall) that act as a flexural member. The present invention provides various alternate acoustic isolation features which substantially eliminate vibrations being passed back into the machine spindle/structure from the ultrasonic system, or passed from the machine to the tool tip. The novel aspects of these embodiments of this invention include: (i) the use of various geometrical features to aid in the isolation of ultrasonic energy; (ii) the use of secondary materials to dampen mechanical vibrations from the case/housing; (iii) the design of an acoustic isolation feature which is sufficient for applying machining forces while flexing in a manner which eliminates the transmission of vibrations back into the machine spindle/structure; and (iv) the design and incorporation of specialty geometry to enhance secondary motion such as torsional excitations.

Figure 3:
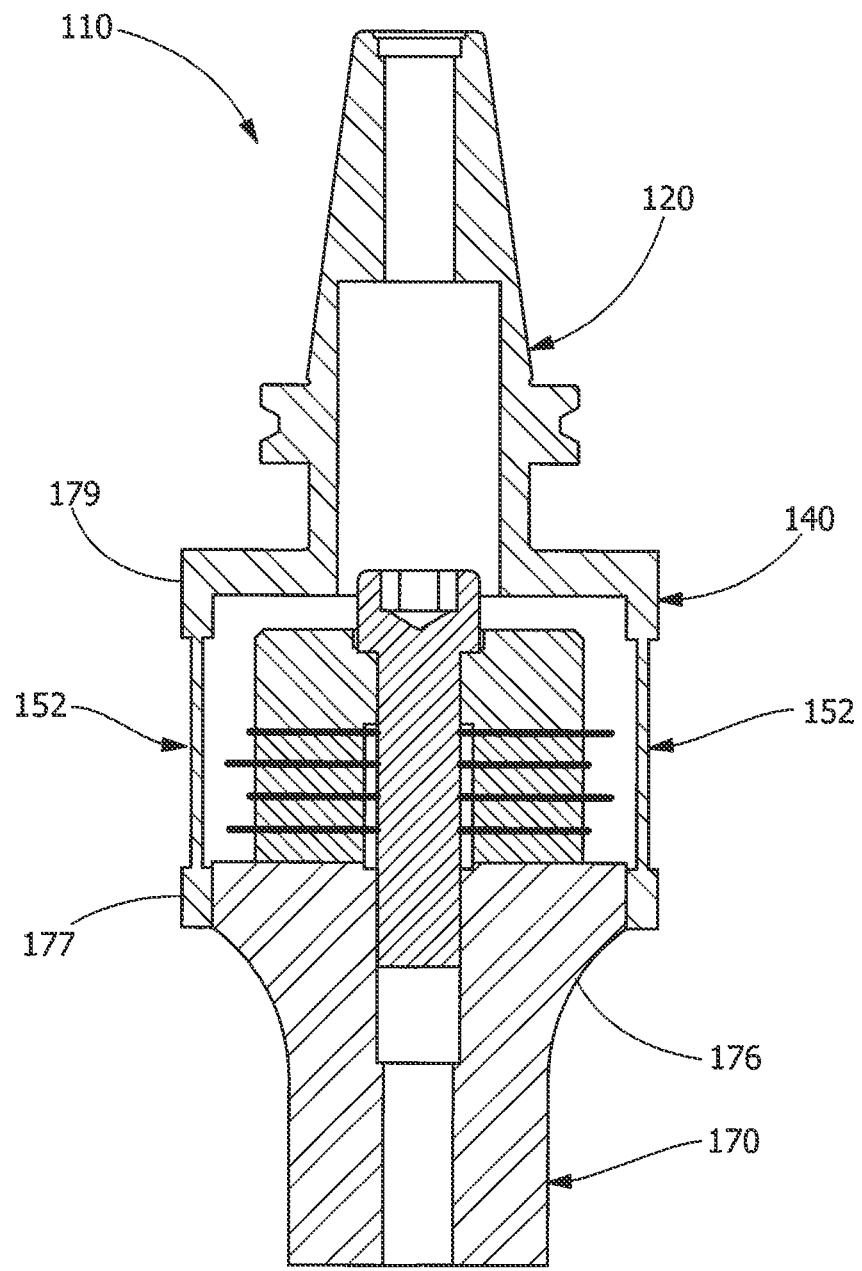
FIG. 3 is a cross-sectional side view of an ultrasonic machining module in accordance with the present invention, showing a first alternate embodiment of the housing component thereof.

FIG. 3 is a cross-sectional side view of an ultrasonic machining module 110 in accordance with the present invention, showing a first alternate housing component 140, which is disposed between tool holder 120 and ultrasonic transducer assembly 170. This embodiment isolates vibrations created by ultrasonic excitation within ultrasonic machining module 110 by using a thin-walled structure 152 which is intended to flex or vibrate along with the ultrasonic excitation. This embodiment includes a first rigid body 177 affixed to the nodal position of transducer front mass 176 to rigidly couple the two bodies, thereby transmitting acoustical energy. Moving upward, the walls of housing 140 are reduced in thickness from the nodal rigid body, which is then intended to flex or vibrate accordingly. The upper most portion of housing 140 then increases in thickness arriving at a second rigid mass 179, which is integrated with conventional tool holder 120. This approach rigidly supports ultrasonic machining module 110, thereby isolating unwanted vibrations to housing 140.

Figure 4:
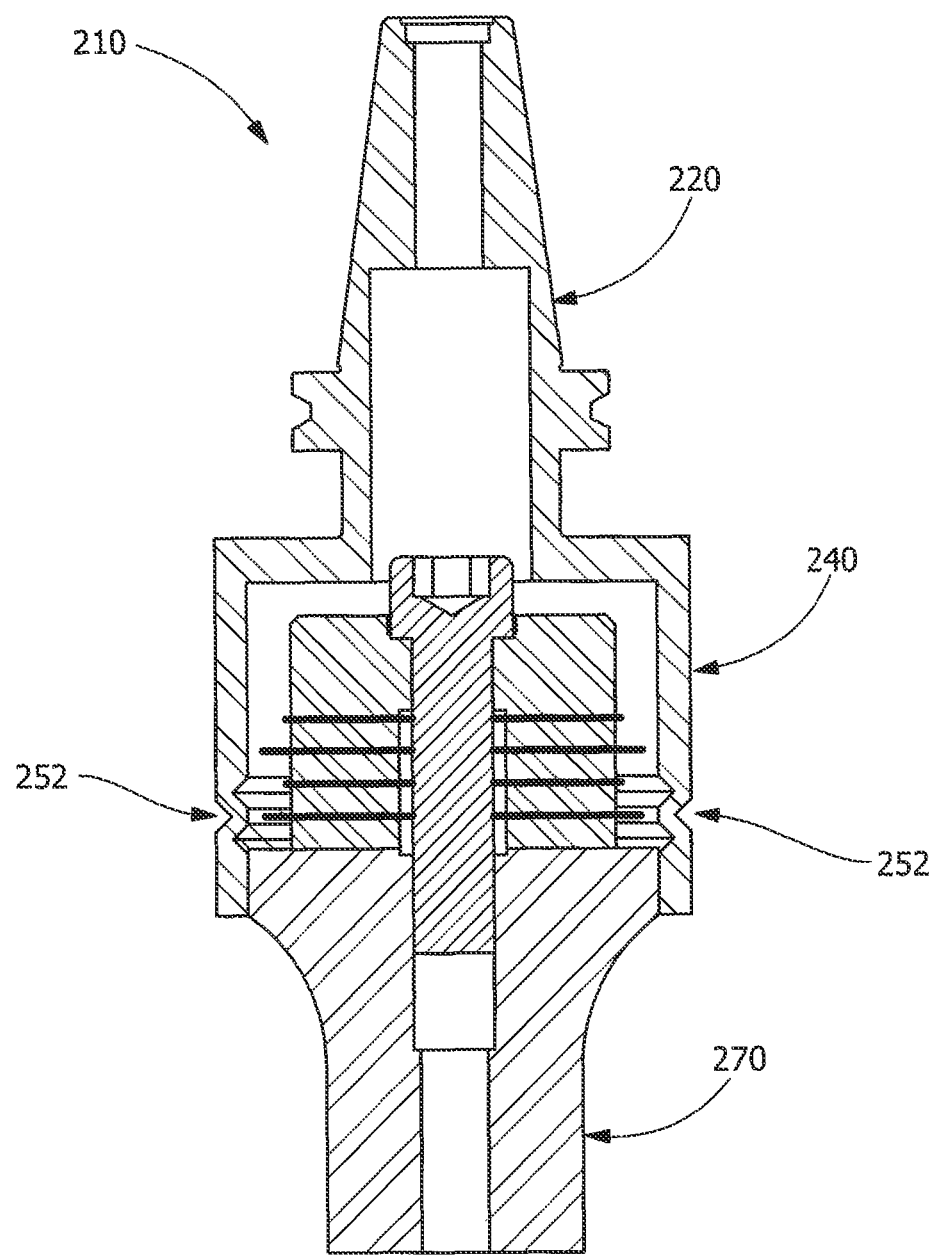
FIG. 4 is a cross-sectional side view of an ultrasonic machining module in accordance with the present invention, showing a second alternate embodiment of the housing component thereof.
Figure 5:
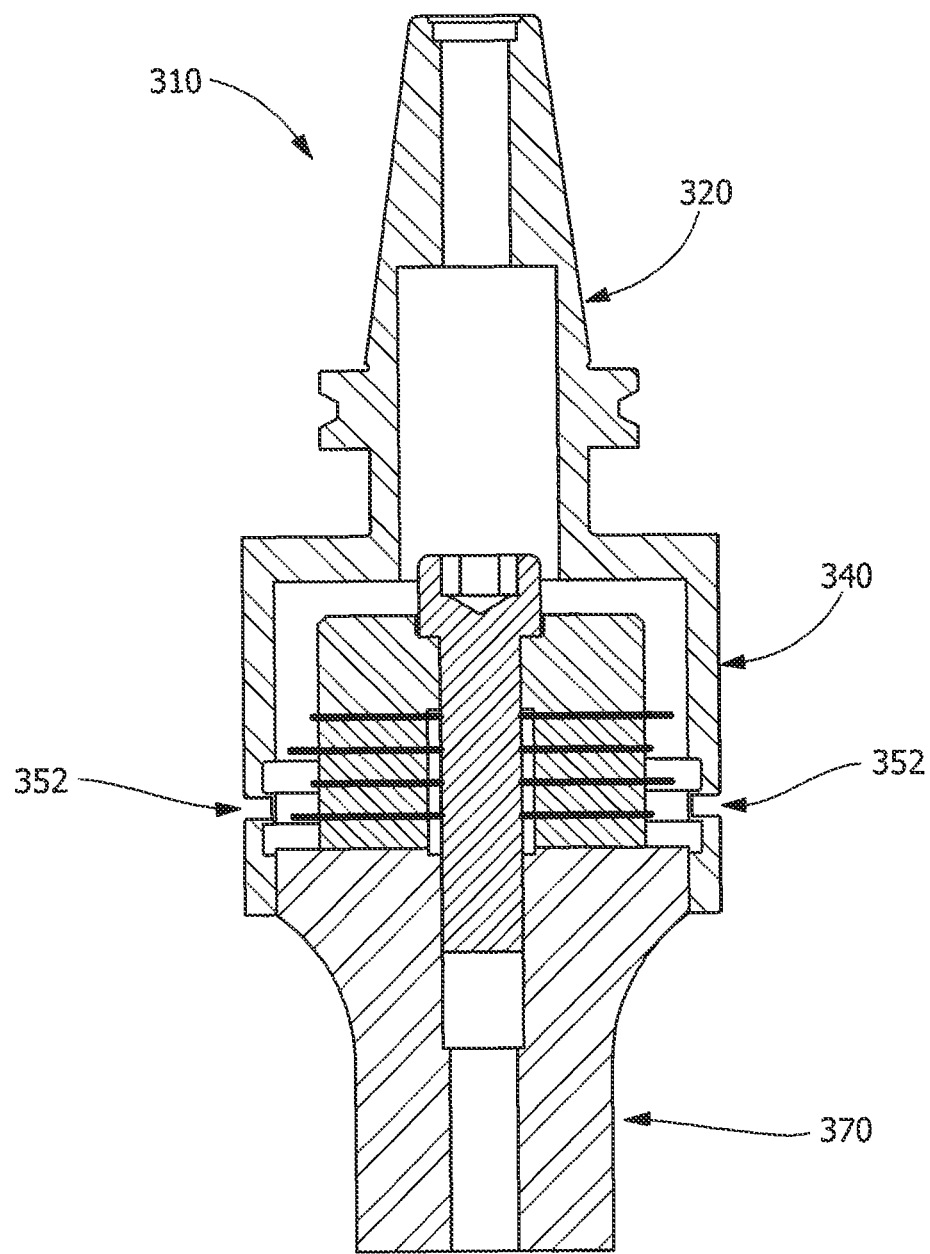
FIG. 5 is a cross-sectional side view of an ultrasonic machining module in accordance with the present invention, showing a third alternate embodiment of the housing component thereof.

FIG. 4 is a cross-sectional side view of an ultrasonic machining module 210 in accordance with the present invention, showing a second alternate housing component 240, which is disposed between tool holder 220 and ultrasonic transducer assembly 270. In this embodiment, housing 240 includes vibration isolating region 252, wherein rather than employing circular or round features within the walls of housing 240, triangular geometric reliefs have been added. Similarly, FIG. 5 is a cross-sectional side view of an ultrasonic machining module 310 in accordance with the present invention, showing a third alternate housing component 340, which is disposed between tool holder 320 and ultrasonic transducer assembly 370. In this embodiment, housing 340 includes vibration isolating region 352, wherein rather than employing circular or round features within the walls of housing 340, rectangular geometric reliefs have been added.

Figure 6:
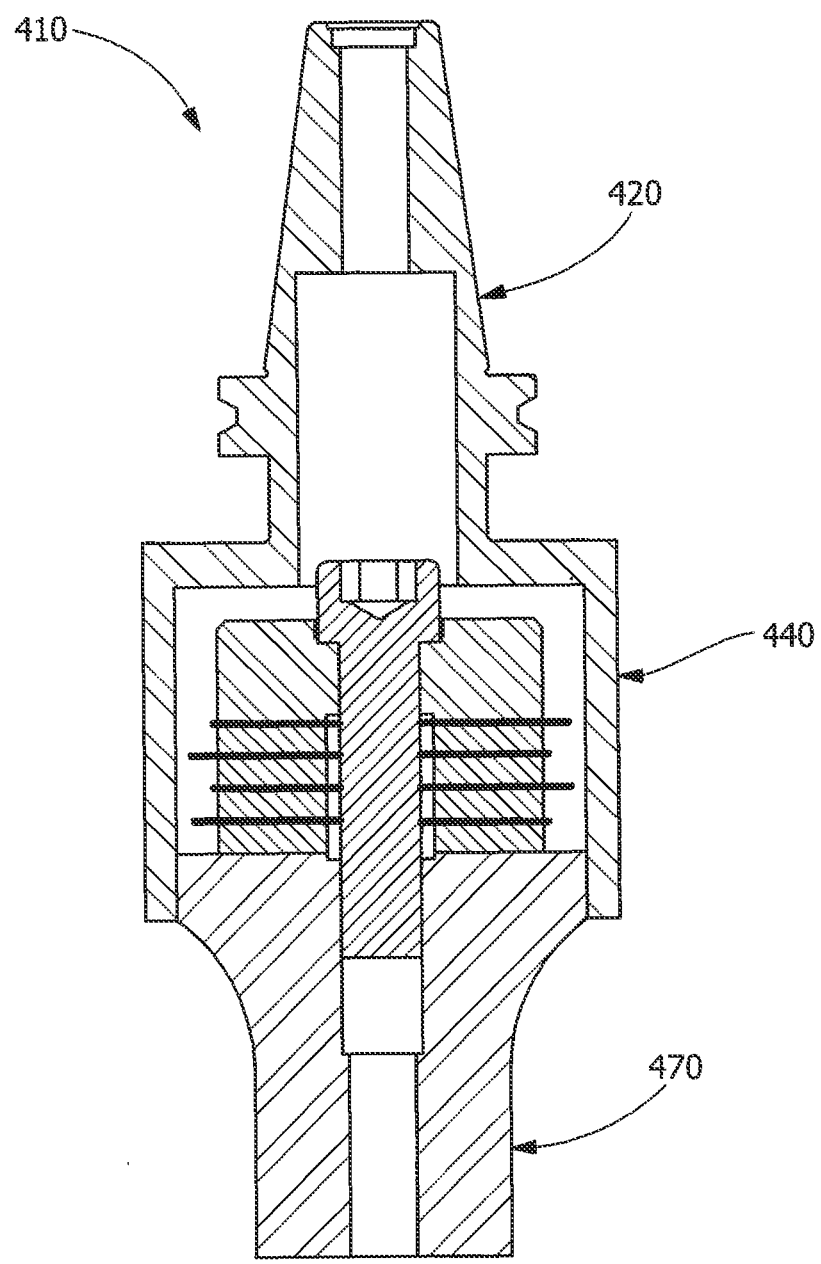
FIG. 6 is a cross-sectional side view of an ultrasonic machining module in accordance with the present invention, showing a fourth alternate embodiment of the housing component thereof.
Figure 7:
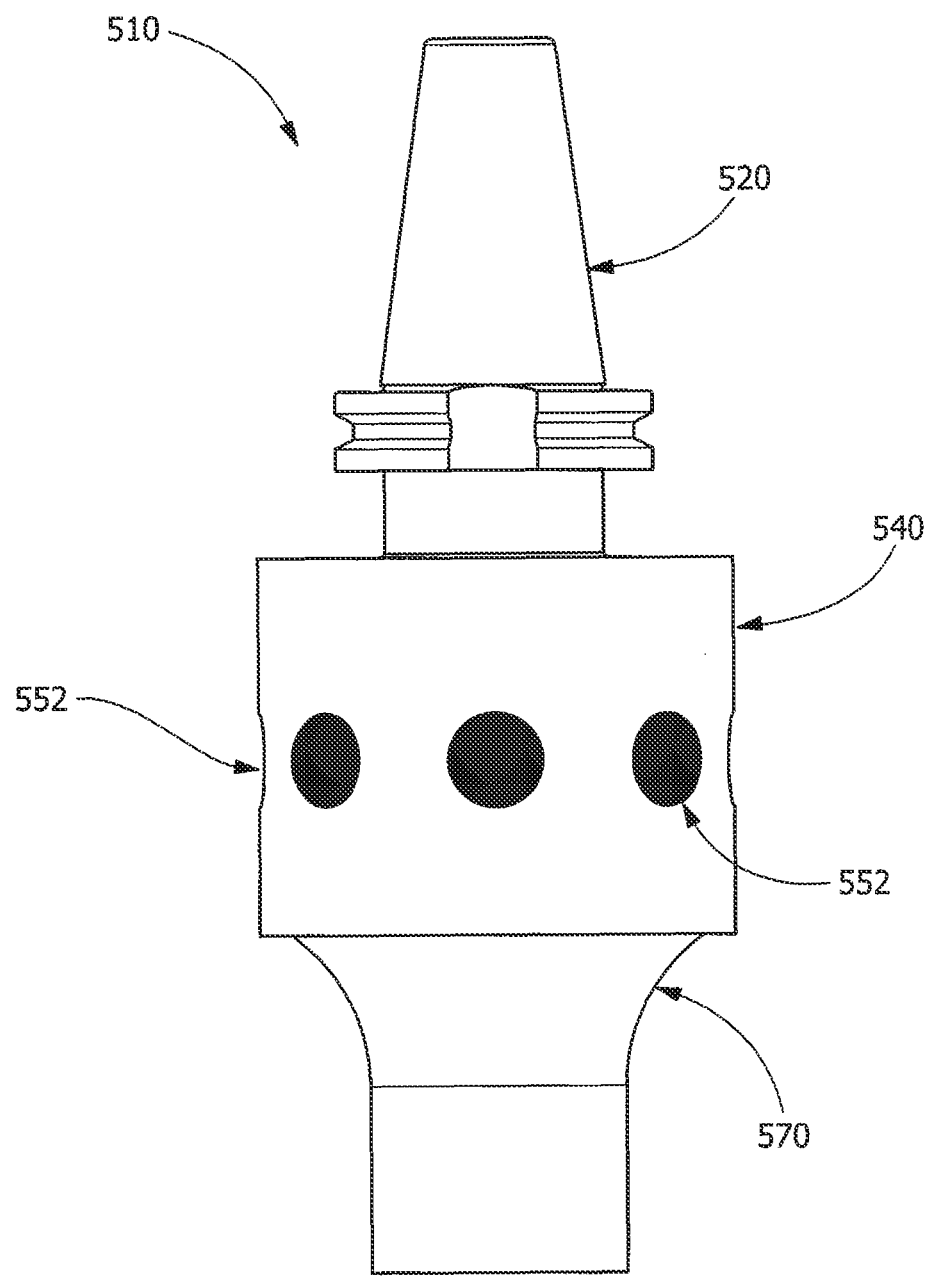
FIG. 7 is a side view of an ultrasonic machining module in accordance with the present invention, showing a fifth alternate embodiment of the housing component thereof.

FIG. 6 is a cross-sectional side view of an ultrasonic machining module 410 in accordance with the present invention, showing a fourth alternate housing component 440, which is disposed between tool holder 420 and ultrasonic transducer assembly 470. This embodiment incorporates no discernable reliefs or isolation features into housing 440, but rather modifies the walls of housing 440 to be a $\lambda/4$ wavelength system in which the housing walls are put into resonance with ultrasonic machining module 410. Arriving at the $\lambda/4$ wavelength involves a predetermined wall length for housing 440, which is based on operating frequency. For example, a 20 kHz resonator would utilize a housing wall length of approximately 2.63 inches FIG. 7 is a side view of an ultrasonic machining module 510 in accordance with the present invention, showing a fifth alternate housing component 540, which is disposed between tool holder 520 and ultrasonic transducer assembly 570. This embodiment provides a rigid housing 540 that includes vibration dampening features 552 incorporated directly therein. Vibration dampening features 552 are essentially cutouts formed in the walls of housing 540, and these cutouts may be backfilled with vibration dampening materials such as, for example, rubber, elastomer, alloys such as tin or Inconel, and/or other suitable materials. Vibration dampening features 552 may be circles, squares, rectangles, triangles, ellipses, or combinations thereof, and a variety of other geometries are also possible.

Figure 8:
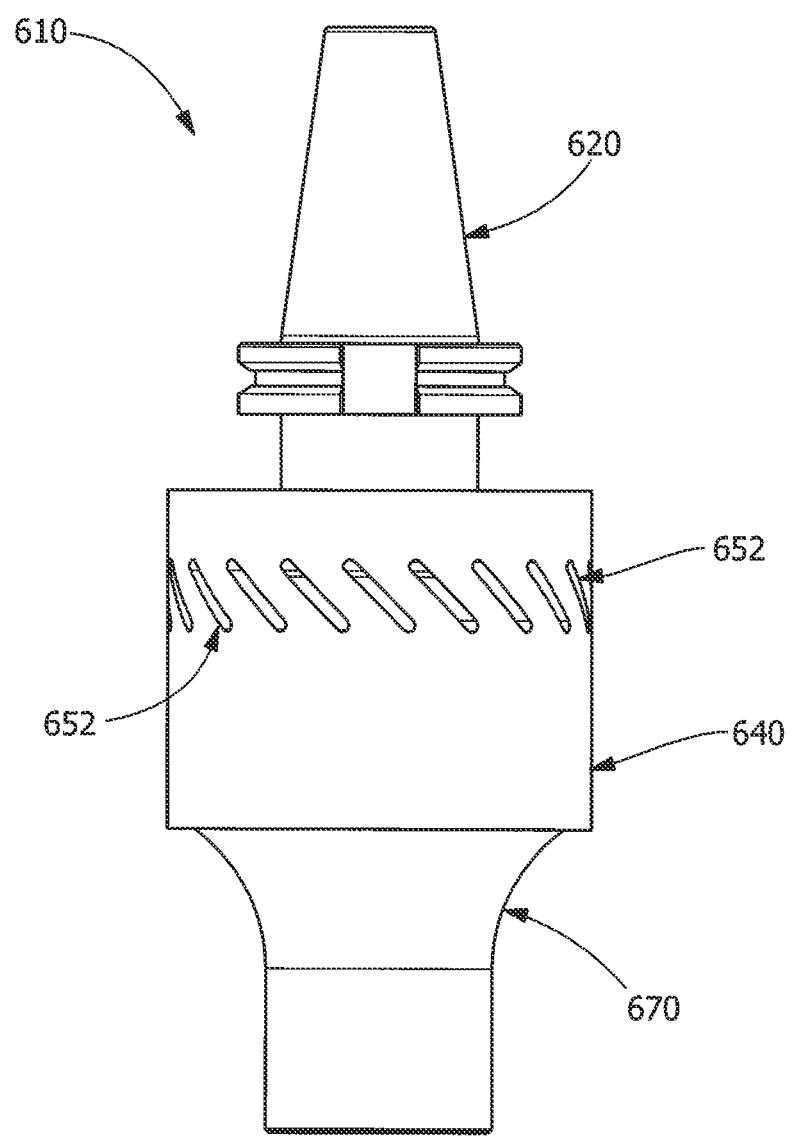
FIG. 8 is a side view of an ultrasonic machining module in accordance with the present invention, showing a sixth alternate embodiment of the housing component thereof.

FIG. 8 is a side view of an ultrasonic machining module 610 in accordance with the present invention, showing a sixth alternate housing component 640, which is disposed between tool holder 620 and ultrasonic transducer assembly 670. This embodiment also includes cutouts or features 652 formed in housing 640 that have a specific geometry that prevents acoustical energy from potentially being transmitted back into the machine tool. In this embodiment, while the specific geometry does isolate vibrations, the cutouts also enhance the vibration produced at the tip of a tool being used with ultrasonic machining module 610. For example, it is possible to increase the amount of torsional displacement that is present at the tool tip beyond what is produced by the longitudinal displacement when driven by an ultrasonic wave. This in turn creates a mixed mode device, which when driven by a longitudinal mode, longitudinal excitation flexes the cutouts and then drives the entire body in a torsional manner. An example of this is shown in FIG. 8, wherein slot diameter, length, angle, and direction will dictate the amount of torsional displacement.

Figure 9A:
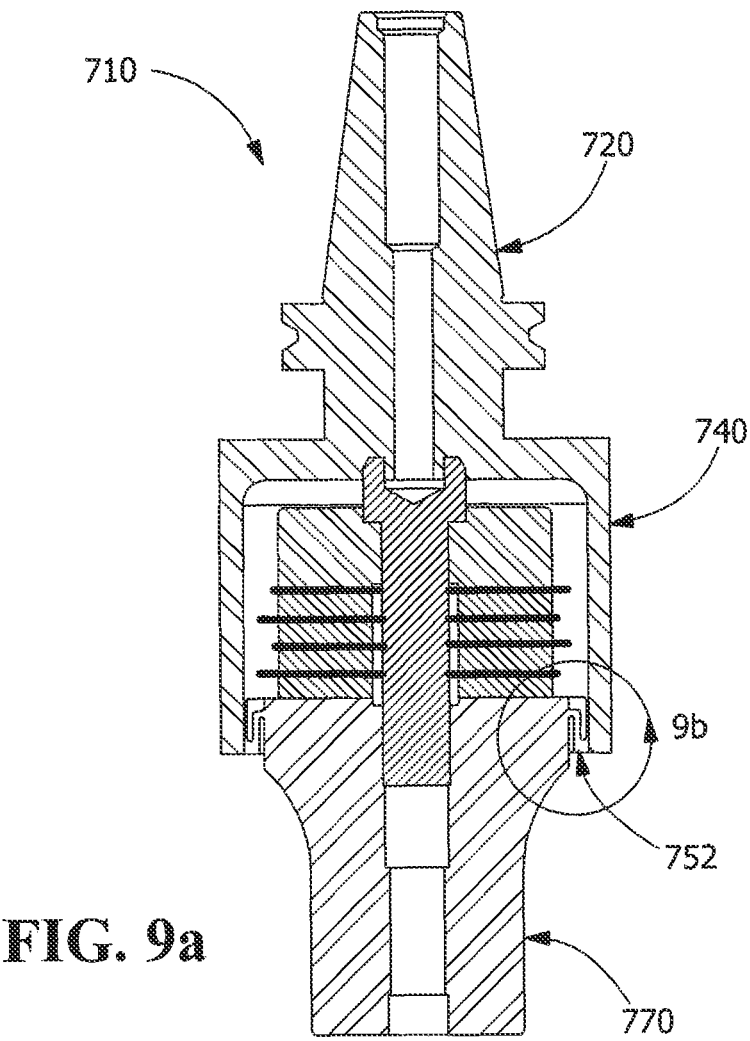
FIGS. 9a-b are cross-sectional side views of an ultrasonic machining module in accordance with the present invention, showing a flexible spring-like structure located at the nodal position of the transducer component thereof.
Figure 9B:
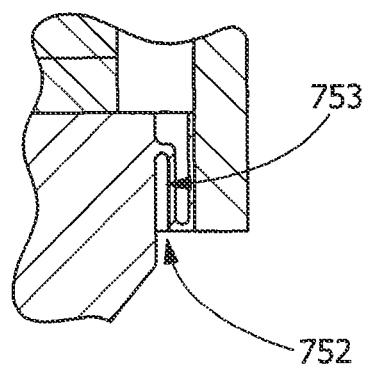

FIGS. 9a-b are cross-sectional side views of ultrasonic machining module 710 in accordance with the present invention, showing vibration isolating feature 752, which includes flexible spring-like structure 753 located at the nodal position of transducer 770, which is located beneath housing 740 and tool holder 720. While spring-like structure 753 does exhibit flexion that is adequate for isolating unwanted vibration generated by transducer 770, spring-like structure 753 does retain enough rigidity for withstanding axial and side loads when subjected to machining operations. In this embodiment, flexible spring-like structure 753 is capable of vibrating both axially and radially. However, under forces in excess of 500 pounds, ultrasonic machining module 710 must not be capable of deforming, moving, or being displaced by the resultant force. Furthermore, the system must not dampen the vibrations when subjected to said loads.

Figure 10A:
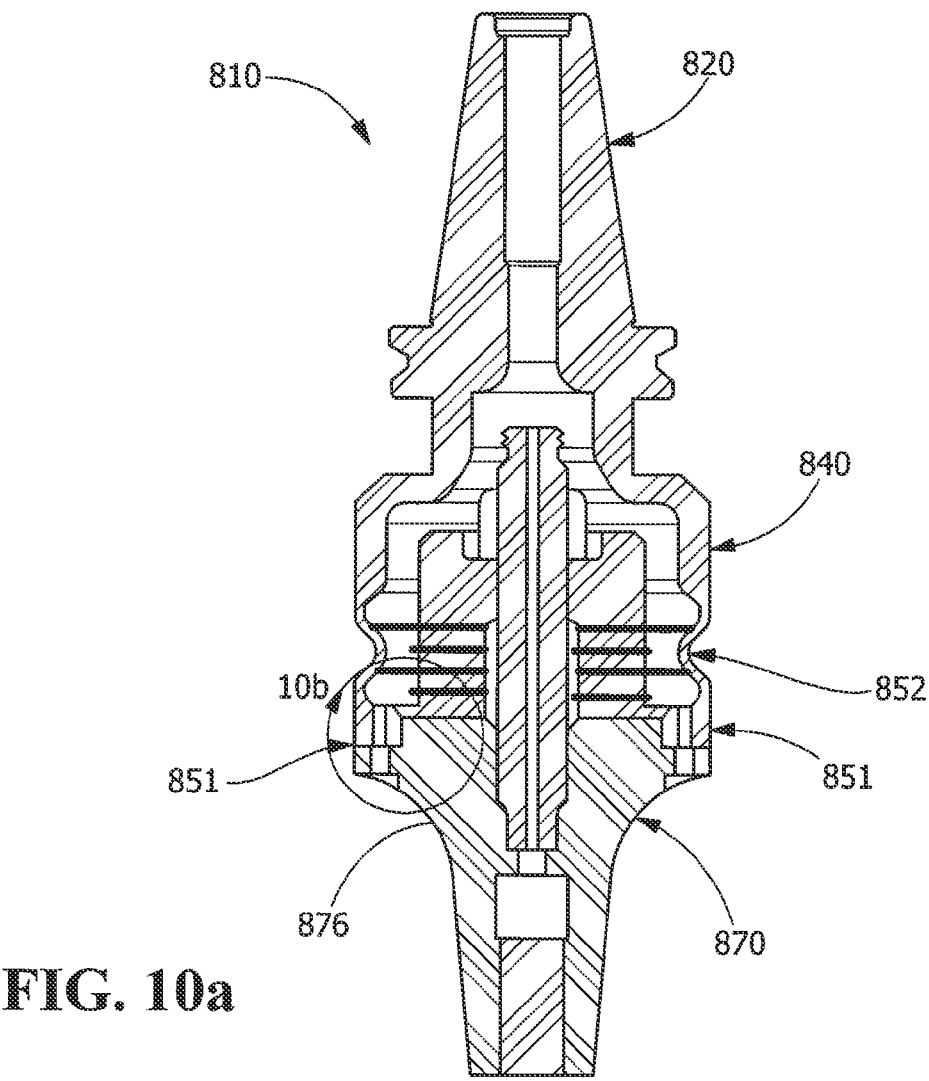
FIGS. 10a-b are cross-sectional side views of an ultrasonic machining module in accordance with the present invention, wherein the transducer component thereof includes precision geometry that acts as an alignment boss, and wherein the alignment boss is positioned at the nodal position of the transducer.
Figure 10B:
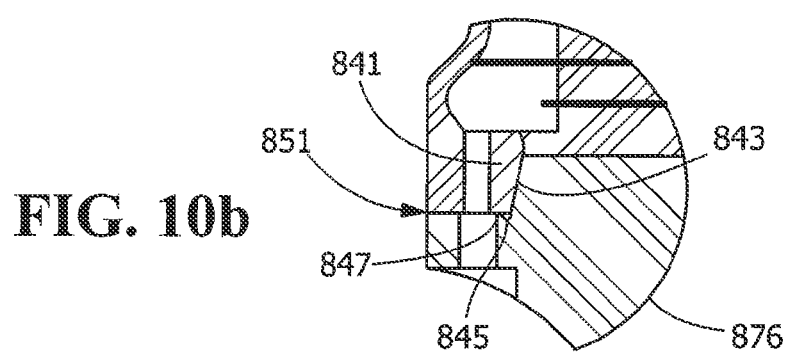

FIGS. 10a-b are cross-sectional side views of an ultrasonic machining module 810 in accordance with the present invention, wherein ultrasonic transducer assembly 870 includes precision geometry that acts as an alignment boss 843 that is positioned at nodal position 851 of front mass 876. As with other embodiments disclosed herein, this embodiment of the present invention includes an ultrasonic transducer assembly 870 that is joined with tool holder 820 and housing 840. This embodiment also includes specific geometric features for providing precision alignment of the tool axis, sealing of ultrasonic machining module 810, and vibration control. This precise geometry also acts as an internal sealing system in which a tapered or conical flange 841, which is formed in housing 840, is stretched within its elastic limits over a tapered or conical alignment boss 843, thereby creating a seal against horizontal base 847, which is formed on ultrasonic transducer assembly 870. A small groove 854 formed in horizontal base 847 acts as an O-ring groove for providing additional sealing. Alignment boss 843 is located specifically at the $\lambda/4$ nodal position (the point of maximum radial displacement) in a $\lambda/2$ resonator for preventing horizontal base 847 from driving in a shear, bending, and/or axial mode; thereby maintaining the vibration-isolating properties of housing 840 and region 852.

While the present invention has been illustrated by the description of exemplary embodiments thereof, and while the embodiments have been described in certain detail, there is no intention to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the general inventive concept.

What is claimed:

1. A device for use in a machining system, comprising:
   (a) an ultrasonic transducer having a known nodal position, wherein the ultrasonic transducer is adapted to receive a machining tool, and wherein the ultrasonic transducer includes:
       (i) a front mass;
       (ii) a back mass;
       (iii) a plurality of piezoelectric ceramics positioned between the front mass and the back mass;
       (iv) at least one source of electricity connected to the piezoelectric ceramics; and
       (v) a compression member passing through the front mass, back mass, and ceramics, wherein the compression member is operative to apply compressive force to the ceramics;
   (b) a vibration-isolating housing adapted to be both compatible with a machining system and to receive the ultrasonic transducer therein, wherein the housing further includes a spring-like feature formed radially therein above the front mass, wherein the spring-like feature further includes a curved and thinned section of the housing, and wherein the curved and thinned section of the housing is operative to permit flexion in the housing for isolating all vibrations generated by the ultrasonic transducer when the device is in operation except axial vibrations transmitted to the machining tool, thereby preventing unwanted vibrations from traveling backward or upward into the machining system; and
   (c) an internal sealing system, wherein the internal sealing system includes:
       (i) a conical alignment boss formed in the transducer at the nodal point thereof;
       (ii) a conical flange formed in the housing, wherein the conical flange is stretched within its elastic limits over the conical alignment boss thereby sealing the housing against a horizontal base formed on the transducer; and
       (iii) a groove formed in the horizontal base on the transducer for receiving an O-ring, wherein the O-ring provides additional sealing properties to the device.

2. The device of claim 1, further comprising a tool holder, wherein the tool holder and the top portion of the housing are mechanically coupled to one another or are integrated with one another.

3. The device of claim 1, wherein the ultrasonic transducer further includes a modified collet adapted to receive the machining tool.

4. The device of claim 1, wherein the ultrasonic transducer further includes at least one electrical connector.

5. A device for use in a machining system, comprising:
   (a) an ultrasonic transducer having a known nodal position, wherein the ultrasonic transducer is adapted to receive a machining tool, and wherein the ultrasonic transducer includes:
       (i) a front mass;
       (ii) a back mass;
       (iii) a plurality of piezoelectric ceramics positioned between the front mass and the back mass;
       (iv) at least one source of electricity connected to the piezoelectric ceramics;
       (v) a compression member passing through the front mass, back mass, and ceramics, wherein the compression member is operative to apply compressive force to the ceramics;
       (vi) a modified collet for receiving the machining tool; and
       (vii) at least one electrical connector;
   (b) a vibration-isolating housing adapted to be both compatible with a machining system and to receive the ultrasonic transducer therein, wherein the housing further includes a spring-like feature formed radially therein above the front mass, wherein the spring-like feature further includes a curved and thinned section of the housing, and wherein the curved and thinned section of the housing is operative to permit flexion in the housing for isolating all vibrations generated by the ultrasonic transducer when the device is in operation except axial vibrations transmitted to the machining tool, thereby preventing unwanted vibrations from traveling backward or upward into the machining system;
   (c) a tool holder, wherein the tool holder and the top portion of the housing are mechanically coupled to one another or are integrated with one another; and
   (d) an internal sealing system, wherein the internal sealing system includes:
       (i) a conical alignment boss formed in the transducer at the nodal point thereof;
       (ii) a conical flange formed in the housing, wherein the conical flange is stretched within its elastic limits over the conical alignment boss thereby sealing the housing against a horizontal base formed on the transducer; and
       (iii) a groove formed in the horizontal base on the transducer for receiving an O-ring, wherein the O-ring provides additional sealing properties to the device.

* * * * *